United States Patent [19]

Fredriksson et al.

[11] 4,043,175

[45] Aug. 23, 1977

[54] AUTOMATIC METHOD AND APPARATUS FOR DIGITALLY INDICATING RESPONSE CHARACTERISTICS OF GEOPHONES OF A GEOPHYSICAL DATA ACQUISITION SYSTEM

[75] Inventors: Oke A. Fredriksson; Elmer L. Thomas, both of Fullerton, Calif.

[73] Assignee: Chevron Research Company, San Francisco, Calif.

[21] Appl. No.: 618,602

[22] Filed: Oct. 1, 1975

[51] Int. Cl.$^2$ ............................................. G01V 13/00
[52] U.S. Cl. ................................... 73/1 DV; 73/67.2; 340/5 C; 340/15.5 DP
[58] Field of Search ...................... 73/67.2, 67, 1 DV; 340/5 C, 15.5 R, 17 R, 15.5 DP

[56] References Cited

U.S. PATENT DOCUMENTS

| | | | |
|---|---|---|---|
| 2,648,979 | 8/1953 | Cornett | 73/1 DV |
| 2,748,348 | 5/1956 | McCarter | 73/1 DV |
| 3,858,169 | 12/1974 | Bardeen | 73/1 DV |
| 3,899,768 | 8/1975 | Quay et al. | 340/15.5 DP |
| 3,930,216 | 12/1975 | Hall | 340/5 C |

Primary Examiner—Richard C. Queisser
Assistant Examiner—Stephen A. Kreitman
Attorney, Agent, or Firm—R. L. Freeland, Jr.; H. D. Messner

[57] ABSTRACT

This invention relates to an automatic method and apparatus for quick and convenient testing of one or more geophones of a geophysical data acquisition system through the generation and analysis of the impulse response characteristics of such geophones. In particular, geophone response characteristics related to first and second adjacent absolute peak amplitudes associated with the damped equation of motion of the geophone coils are detected and digitally indicated in a surprisingly accurate manner, irrespective of whether or not the testing is carried out in a laboratory or field environment.

18 Claims, 13 Drawing Figures

AUTOMATIC METHOD AND APPARATUS FOR DIGITALLY INDICATING RESPONSE CHARACTERISTICS OF GEOPHONES OF A GEOPHYSICAL DATA ACQUISITION SYSTEM

RELATED APPLICATIONS INCORPORATED HEREIN BY REFERENCE

"Automatic Measurement and Display of Reasonance Frequencies of Seismic Detection Elements", O. A. Fredrickson and E. L. Thomas, Ser. No. 618,606, filed Oct. 1, 1975, now U.S. Pat. No. 4,015,202 and "Digital Processor for Selectively Synthesizing Sinusoidal Waveforms, Say Suitable for Testing Geophones or Combinations of Geophones of a Geophysical Data Acquisition System", O. A. Fredriksson and E. L. Thomas, Ser. No. 618,550, filed Oct. 1, 1975.

FIELD OF THE INVENTION

This invention relates to impulse testing of reactive elements or combinations of reactive elements of a geophysical data aquisition system, and more particularly to a method and apparatus which automatically generates highly accurate geophone response characteristics associated with the damped equation of motion of the coils of such geophones, after a constant current source, in circuit therewith and providing initial displacement of the coils undergoing testing, has been removed.

The term "impulse testing" is used to define a system for testing geophone performance parameters. In such a system, first one or more geophones are pre-excited by a DC current. The current displaces the geophone coils in a direction dependent upon current polarity and by an amount proportional to the current, the magnetic field in which the coil is suspended and the spring constant of the mechanism supporting the coil. When the pre-excitation current is terminated, the spring tension forces the coil toward its rest position. This results in a mechanical oscillation of the coil about its rest position, which is predicated on the mass of coil, the spring constant of its support and the damping factor imposed on the spring mass system.

As the coil undergoes damped vibration, a voltage is generated as the coil moves in the magnetic field. Its instantaneous value is determined by the equations of motion of the damped geophone coil. A certain response characteristic can then be derived, say from the ratio of amplitudes of the first and second peak absolute voltage maximums.

BACKGROUND OF THE INVENTION

In seismic exploration, acoustic waves are generated and sent downward into the earth. Reflections occur at the interfaces of surface strata whose acoustic impedances differ and are subsequently detected by groups of geophones positioned at the earth's surface. Each geophone group (which can comprise a number of individual geophones) produces a composite electrical signal which drives indicating and recording equipment, usually located in a recording truck, the equipment being electrically connected to the geophone group through a geophone cable or segment of such a cable.

Whether the acquisition of the seismic data occurs in remote regions of the world or in more urban areas, the geophones of each geophone group should be frequently tested; only recently has the importance of such testing been documented; it has been found that perhaps up to 20% of the geophones used on a daily basis may be found defective in some way that is undetectable by the field crew using conventional techniques.

Prior art methods related to impulse testing of geophones in a field environment are somewhat limited. For example, it may be desirable to detect the first and second adjacent absolute peak voltages of the damped sinusoidal voltage as a function of the same common impulse response, i.e., commoncycle testing. From such amplitude data, the damping factor (b) and the relative sensitivity (G) of the geophones can be determined with greater accuracy. With regard to the latter, the prior art systems of which we are aware do not provide adjacent peak amplitude value on a common cycle or within the accuracies that have now been found desirable for proper evaluation of geophones.

OBJECT OF THE INVENTION

An object of the present invention is the provision of a novel impulse-testing apparatus and method, fully automated to perform convenient response testing of one or more geophones of a geophysical data acquisition system in a highly efficient manner to allow the field crewto determine — in minimum time — whether or not the geophone undergoing testing meets minimum performance standards.

SUMMARY OF THE INVENTION

In accordance with the present invention, a portable, light-weight impulse-testing apparatus and method is provided for detecting and digitally indicating selected amplitude indications of the damped motion of coils of one or more geophones undergoing testing after the coils, having been displaced and released from their displaced positions, undergo damped vibration. From the above-indicated value indications, geophone performance characteristics of interest, namely damping factor (b) and relative sensitivity (G), can be calculated. Result: literally hundreds of geophones can be tested in the field over a relatively short time span to determine if they meet minimum performance standards for effective geophone operations.

In accordance with apparatus aspects of the present invention, a switch controller is used to abruptly disconnect a DC source from the geophones and thereby allow their coils to oscillate in accordance with the mass, compliance and damping associated with the system. Simultaneously the same switch connects an analog responder conditioning and amplifying circuit to a digital voltmeter and display module monitoring the voltage generated by the geophone coils. A digital clock circuit provides a plurality of timing pulses to the pre-excitation of current source, the digital voltmeter and display module; these clocks pace operations which allow, inter alia, indications of the peak voltage responses of interest, namely: (1) the first peak positive voltage, $A_1$, and (2) the ratio of $A_1$ to $A_2$, i.e., $\uparrow A_1/A_2 |$, where $A_2$ is the first peak negative-going voltage adjacent to the peak positive voltage $A_1$. Also provided by the present invention is a GO-NO GO indication as to the acceptability of the above-indicated amplitude values as indicated by counter capacity (or lack thereof) within the digital voltmeter and display module. In that way, the indication of underflow and overflow bit information associated with the digital generation of the amplitudes of the responses of interest can also be monitored. In addition to a master clock train, multiples of that clock are also used by various elements of the system of the present invention to provide needed synchronization between elements of the system during the bit data generation.

In accordance with further aspects of the present invention, the analog responder circuit is further characterized by the fact that it provides two conditioned signals of the voltage response of the geophone coils as the latter undergo damped oscillation. The first relates to the maximum, initial peak amplitude response above (or below) a horizontal datum and the second corresponds to the next adjacent peak amplitude response below (or above) the same datum. In this way, these signals can be separated into a first maximum peak ($A_1$) and a second maximum negative peak ($A_2$) adjacent to $A_1$, respectively. Subsequently, analog-to-digital conversion (ADC) of each of these signals can utilize similar circuitry to provide the amplitude values of interest. I.e., the ADC's that are used with the parallel first and second signals are only of slightly different construction, but include the same associated logic circuitry to provide digital indications of the amplitude values of interest, namely $A_1$ and the ratio of $A_1$ to $A_2$, from which geophone performance standards of interest, say the geophone relative sensitivity factor (G) as well as the damping factor (b), supra, can be calculated.

Further features, objects and advantages of the present invention will become more apparent to those skilled in the art from a detailed reading of the following description of preferred embodiments thereof, each reading being taken in light of the accompanying drawings.

DESCRIPTION OF PREFERRED EMBODIMENTS OF THE PRESENT INVENTION

Figure 1:
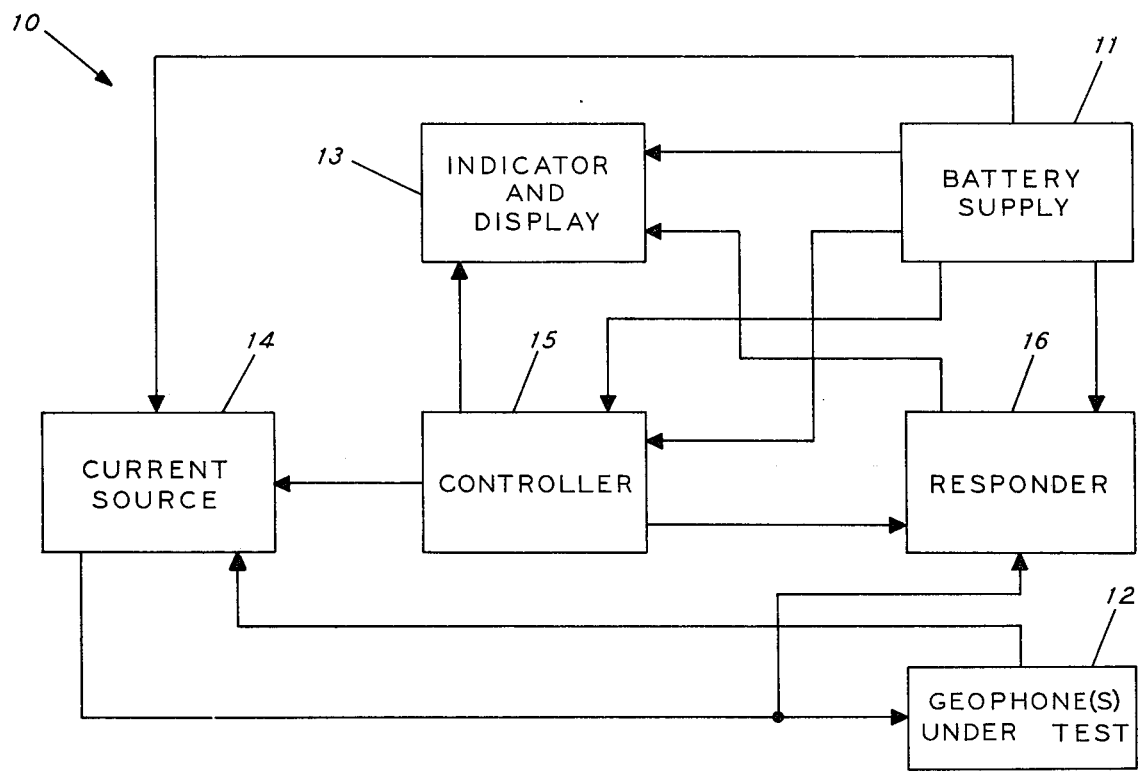
FIGS. 1 and 3 are block diagrams of an automatic impulse-testing apparatus of the present invention for providing response values of one or more geophones of a geophysical data acquisition system, such response values being detected and digitally identified and displayed for evaluation in a field or laboratory environment.

Reference should now be had to the drawings, particularly FIG. 1, in which impulse response indicating circuit 10 of the present invention is illustrated. Construction of circuit 10 is within the capability of the art; large-scale integrated circuits (LSIC's) are preferred; thus utilization of the portable battery-pack 11 for field operation of circuit 10 is assured.

Briefly, the purpose of circuit 10 is to indicate impulse response characteristics of one or more of geophones 12 of a geophysical data acqustion system under field or laboratory conditions. Resulting characteristics of geophones 12 are digitally indicated at indicator and display circuit 13. To provide and initiate operations, current source 14 is activated through controller 15; voltage response associated with the equation of damped motion of the coils of the geophones (i.e. vibrations) is detected by responder circuit 16 in circuit with the geophones; then, after digital processing within indicator and display circuit 13, the response characteristics of interest of geophones 12 can be indicated.

Operations of circuit 10 may become more clear once the geophone performance characteristics sought to be evaluated by measurements provided by the circuit of the present invention are identified and understood. A brief discussion of such performance characteristics and their relationship to the response provided by circuit 10 is thus in order and is presented below.

In impulse testing of geophones, a current is forced through the geophone coil; following disconnection between the coil and the associated current circuitry, the coil with mechanically oscillate. It is also known that the amplitude of the oscillations will gradually diminish with time (because of energy dissipation of damping). The effect of damping on the coil motion is given by the following equation, which is useful in providing a valuable performance characteristic for geophone evaluation:

$$b = \sin\tan^{-1}(1/\pi)\ln|A_1/A_2| \qquad (1)$$

where $b$ is the damping factor of interest (a dimensionless number); $A_1$ is the first peak positive amplitude of an equation of damped motion of the geophone coils; and $A_2$ is the next adjacent peak negative amplitude associated with the same equation of damped motion.

Note that the key variable in the first-shown equation is the quotient associated with the term $A_1/A_2$; it is the term $A_1/A_2$ that is one of the amplitude responses provided by circuit 10 of FIG. 1 of the present invention.

A second variable performance characteristic for geophone evaluation of interest, as previously discussed, is set forth in the equation $$G = [A_1 f_o e^{(\cos^{-1} b)(\tan \sin^{-1} b)}]^{1/2} \qquad (2)$$

where G is the relative sensitivity of the geophone under test; $A_1$ is the amplitude value of the first peak of the impulse response of the geophones; $f_o$ is the resonant frequency of the geophones; and b is the damping factor as defned above.

In the derivation of the above sensitivity equation, i.e., equation (2), some clarifying remarks may be in order.

Consider that in the general case of the geophone coil that the mass of the coil bobbin and the length of the coil are the same from geophone to geophone. The displacement of the coil is described by the equation $$\gamma = K_2 [e^{-\alpha t}] \sin \omega t \quad (3)$$

where $\gamma$ is displacement, $K_2$ is a constant, $t$ is time, $\omega$ is angular speed, and $\alpha$ equals $\omega_o b$ where $\omega_o$ is the resonant angular speed of the coil equal to $2\pi f_o$ where $f_o$ is the resonant frequency of the coil and $ib$ is the damping factor, supra.

It can be shown that the maximum velocity of the bobbin is given by $$V_{max} = -\gamma_{max} \omega_o \exp b[\cos^{-1}b - \cos^{-1}(2b^2-1)]/(1-b^2)^{1/2}$$

The force on the bobbin due to current (i) is given by $$F = K_2 B l i$$

where B = magnetic flux density and $l$ = length of coil wire and (i) is the current.

Under our assumption of constant (i) and (1), this can be simplified to $$F = k_3 B$$

In addition, we make use of the well-known expression for the natural frequency of the geophone:

$$\omega_o = (S/m)^{1/2}$$

where S is the spring constant and $m$ is the bobbin mass, assumed constant as mentioned above.

Combining the above expressions, and making use of the fact that $A_1$, the first maximum of the impulse response, occurs at the point where the bobbin velocity is a maximum, we obtain:

$$B^2 = \text{const. } A_1 f_o \exp[\cos^{-1}b \tan \sin^{-1}b]^{1/2}$$

Or, as G, the relative sensitivity is proportional to B, $$G = A_1 f_o \exp(\cos^{-1}b \tan \sin^{-1}b)]^{1/2}$$

which is the same as depicted above in equation (2).

Note from the above equations (1) and (2) that variables to be determined include the following: the resonant frequency $f_o$ of the coil which is provided by the technique disclosed in Ser. No. 618,606, op.cit., the variable $A_1$ and the arithmetic function $A_1/A_2$. It is the latter value, i.e., the $A_1$ value as well as the $A_1/A_2$ variable, which are provided by circuit 10 of the present invention.

One other point needs to be made. Most geophones in use in the field have damping resistors. In this case, only part of the excitation current goes through the coil, the rest goes through the shunt. Assuming all damping resistors are the same, however, the measurement of relative sensitivity G as set forth above is still valid. In the case where known differences in damping resistors exist, the expression for G would be $$G = \frac{Rc + Rs}{Rs} \left[ A_1 f_o e^{(\cos^{-1}b)(\tan \sin^{-1}b)} \right]^{1/2}$$

where Rc is the bobbin resistance and Rs is the damping resistance.

Figure 2:
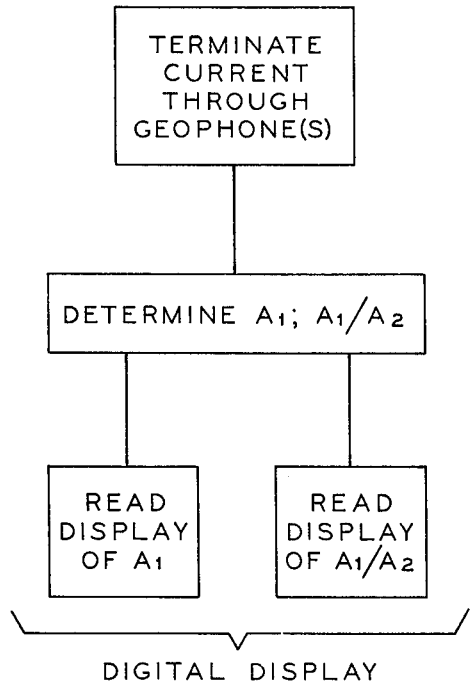
FIG. 2 is a schematic block diagram illustrating the method aspects of the present invention.

FIG. 2 sets forth method aspects of the present invention by which the amplitude responses of interest, i.e., the $A_1/A_2$ and $A_1$ values associated with the evaluation of the performance of the geophones, are sequentially determined.

Note in FIG. 2 that termination of the initial electrical current imparted to the coils produces impulse response from which response characteristics of interest, i.e., $A_1$ and $A_1/A_2$, are determined and indicated; calculations as to geophone performance characteristics of interest, namely the damping factor (b) and the relative geophone sensitivity G, equations (1) and (2), supra, can then be carried out, say by using a hand-held calculator. In this regard, note that the measured responses $A_1$ and $A_1/A_2$ provided by circuit 10 of the present invention are directly related to the performance characteristics of interest, i.e., the relative sensitivity G and geophone damping factor b, so that performance standards and an evaluation of geophones can occur in an effective manner.

Figure 3:
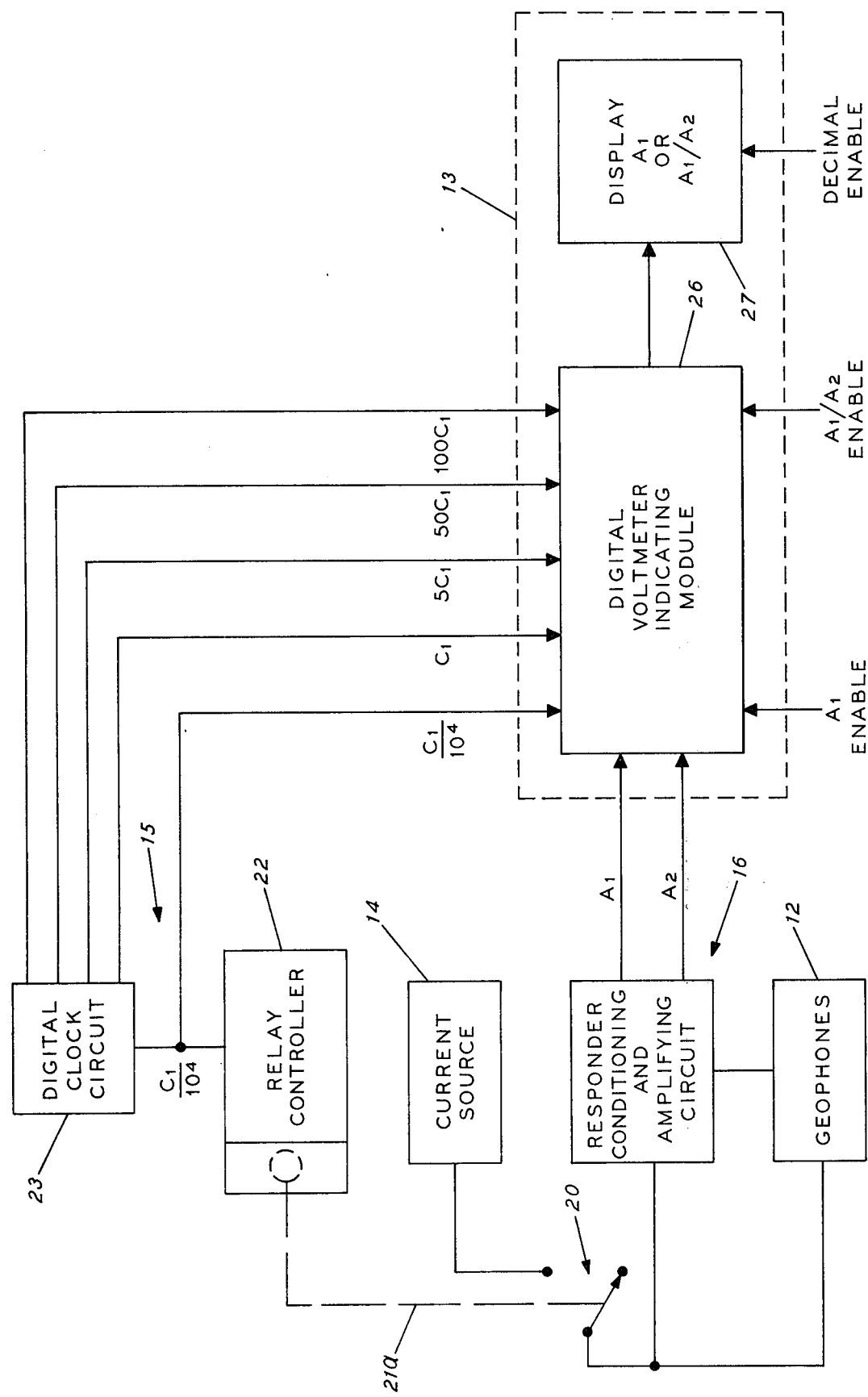

FIG. 3 illustrates apparatus aspects of circuit 10 of the present invention in still more detail.

As shown, reponse values of the waveform associated with the $A_1$ and $A_1/A_2$ parameters of interest are sequentially displayed at indicating and display circuit 13 as a function of time.

Briefly, the voltage responses of the geophones are first conditioned by responder circuit 16. This occurs after the current through the coils has been terminated from current source 14 through action of master relay 20. Responder circuit 16 first amplifies the voltage response, then it splits the latter to form a second parallel signal. The second signal is conditioned and amplified and both the first and second signals pass from responder circuit 16. Note that relay 20 must be positioned as shown before the voltage response of the geophones connected with responder circuit 16 and indicating the display circuit 13 can be indicated.

Note that switch 20 is electrically controlled via linkage 21a by relay controller 22 of master controller 15. Driving the above relay controller 22 is clock pulse train $C_1/10^4$ generated by digital clock circuit 23. Additional clock trains which are produced by clock circuit 23 include: $50C_1$, $100C_1$, $5C_1$ and $C_1$ clocks; these trains synchronize operations of circuitry within digital indicating and display 13 as explained below.

Note that the inputting of clocking and enabling signals is concentrated within digital voltmeter indicating module 26, wherein desired responses related to the amplitude values $A_1$ and $A_1/A_2$ can be accurately generated and displayed at display 27, as explained below.

Figure 4:
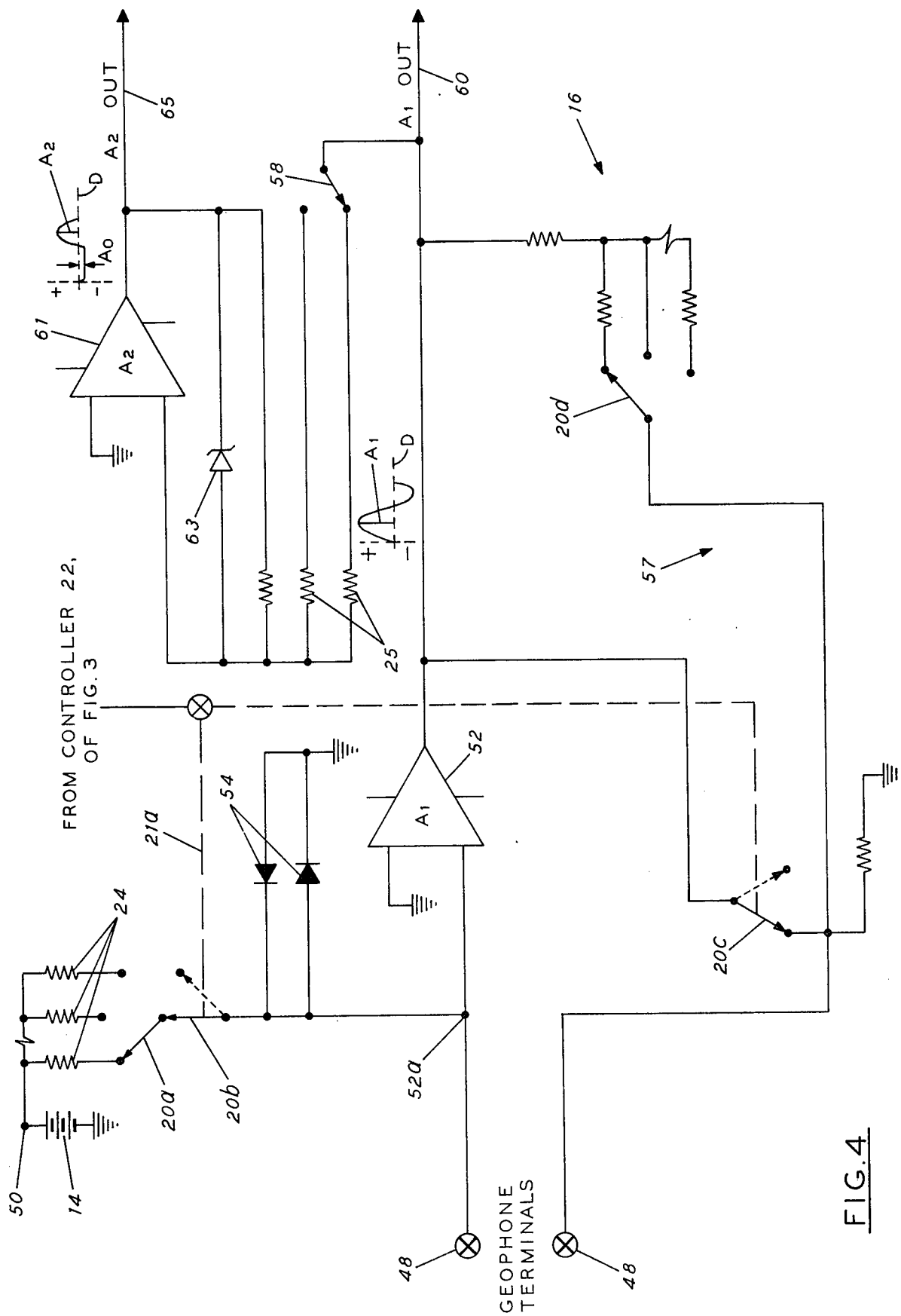
FIG. 4 is a schematic circuit diagram of a responder conditioning and amplifying circuit of the impulse-testing apparatus of FIG. 1 and 3 for providing a "true" and a "conditioned" waveform associated with voltage generated by vibration of geophone coils after initial impulsing thereof.

FIG. 4 illustrates operation of responder circuit 16 of FIG. 3 in more detail.

As previously indicated, the function of circuit 16 is to provide two impulse responses, $A_1$ and $A_2$, indicative of geophone response characteristics of a geophone or geophones connected at terminals 48 of FIG. 4.

A fixed current is first provided at point 50 by current source 14 and a resistor of resistor network 24 when switch elements 20a and 20b are placed in contact with respective linked switch terminals as shown in FIG. 4. The current from source 14 and resistor network 24 appears at the negative input of operational amplifier 52. Since the input of amplifier 52 cannot have a differential voltage in relation to the grounded positive input, the fixed current must be negated by flow through the geophone or geophones tied to terminals 48. That is to say, current flowing towards point 52a must be compensated for by a current of inverted polarity flowing from point 52a. The switch element 20b is closed during this interval of time via linkage 21a of relay controller 22 of FIG. 3 (which also controls switch element 20c). These currents, being equal and opposite in direction, allow point 52a to remain at zero potential, assuming the necessary voltage is developed at the output of amplifier 52 to produce the exact opposite current through the geophone at terminal 48. Diodes 54, of course, prevent source 14 from overdriving amplifier 52, by conducting if driven above a selected threshold.

Assume source 14, terminated at point 50 as shown, is of a positive polarity; then positive current will flow through resistor 24 to point 52a, and the only way that amplifier 52 can provide a negative current to keep point 52a at zero potential is for a voltage at its output to be of negative polarity. During this sequence of events, the output of amplifier 52 will be of a more-or-less constant negative potential. Note that the same negative potential is simultaneously being fed through switch 58 through one of resistors 25 to the input of operational amplifier 61. At this time the output of amplifier 61 will be positive in potential.

At the start of its complementary half-cycle, the $C_1/10^4$ train from digital circuit 23 of FIG. 3 acts through controller 22 as previously mentioned. Result: the current fed into the input of amplifier 52 is abruptly terminated through the re-positioning of switch elements 20b and 20c (switch element 20a remains stationary). Prior to termination, the bobbin has been forced into an elevated (or depressed) position due to the current flowing through the bobbin from amplifier 52. With termination, the bobbin proceeds to fall. As it falls, and during its fall excursion due to generator action, it produces a time-varying impulse response as it cuts lines of flux; and such response is indicated as a waveform having adjacent peak amplitudes equal to $A_1$ and $A_2$ measured above and below, respectively a datum line D. An output associated with the former is generated at the output of amplifier 52. An output having correspondence to the latter is produced from the first-mentioned output and appears as the waveform depicted at the output of amplifier 61 in FIG. 4. Note that it is associated with the negative segment of the equation of coil motion of the geophone.

The polarity of the waveform is of course a function of geophone response characteristics: the amplifier 52 must generate a voltage equal and opposite that produced by the falling geophone bobbin at terminal 48. If the geophone bobbin produces an initial negative voltage at the input of amplifier 52, then that amplifier produces an initially opposite positive voltage response having a maximum peak response equal to $A_1$. And as the bobbin continues its mechanical cycle, the waveform produced by the amplifier 52 passes through zero and becomes negative, that segment having a peak amplitude below datum upon inversion by amplifier 61 produces a response $A_2$ in the manner depicted in FIG. 4.

It should be apparent, since amplifier 61 senses the signal produced at the output of amplifier 52, that the output of amplifier 61 will be going—initially—in the negative direction. Its excursion in the negative direction, however, is limited to a maximum peak amplitude $A_o$ because at a selected setting diode 63 will commence to conduct and therefore limit further negative excursion of amplifier 61. However, at the end of the positive excursion of amplifier 52, there will ensue a negative excursion, which amplifier 61 will follow. Amplitude $A_2$ of that ensuing positive excursion at the output of amplifier 61 (while amplifier 52 is going negative) will be predicated on which one of resisters 25 has been addressed by switch 58, controlled by the human operator.

It is seen that switch element 20a can address different resistors to control the input to amplifier 52. To obtain a maximum output from the geophone at terminals 48, it is desirable that the maximum amount of current permissible drive the geophone without the geophone bobbin hitting the stops. Switch element 20a in effect permits the operator to adjust the current so that the geophone will not hit its stops and still be driven with maximum current.

The resistor addressed by switch element 20d also aids in regard to allowing flexibility of control by the operator.

Assume that switch element 20a has been adjusted to satisfy the conditions that the bobbin is not hitting its stops but is being driven with maximum current. But let it also be assumed that the amplifier 52 output is rather small even under this condition; switch element 20d can then be used to address a particular resistor of network 57 to increase the output from amplifier 52. If a flyer of geophones (say 8 geophones, all in series) is located at terminals 48, switch element 20d must be re-addressed. But the setting of element 20a should be the same as it was for the single geophone, since all of the geophone bobbins of the flyer cock up by the same amount as the single geophone. But there will be a resulting 8-fold increase in flyer output over a single geophone. While switch element 20a could be re-addressed, this is undesirable because though there would be a reduction in the current to make the amplifier 52 output stay within established bounds, the signal-to-noise ratio could now increase by a factor equal to the number of geophones. I.e., the noise picked up by the flyer would be 8-fold greater than that picked up by a single geophone, even though the signal amplitude remained unchanged. What is preferred is to leave the setting of element 20a in the position good for testing a single geophone and then reduce the gain of amplifier 52 by means of the address position of switch element 20d. Result: a high signal-to-noise ratio is retained with minimum human intervention.

Figure 5:
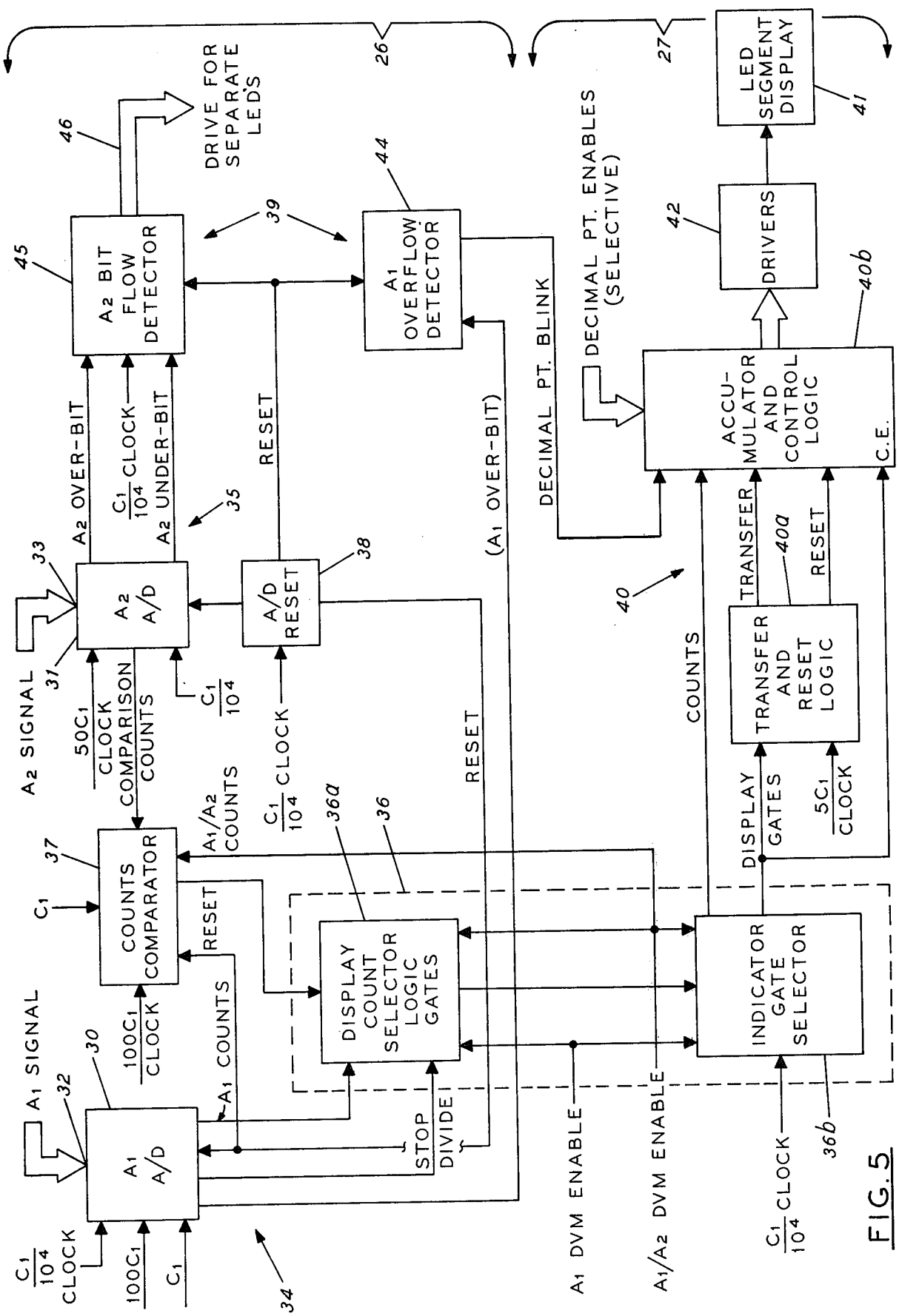
FIG. 5 illustrates the digital voltmeter module in association with the display of FIG. 3.

FIG. 5 illustrates digital voltmeter module 26 in association with display 27 of FIG. 3. Consideration is first given to digital voltmeter module 26.

Note that in FIG. 5 module 26 is seen to include analog-to-digital converters 30 and 31 (ADC's), which separately accept the conditioned first and second analog waveforms of responder circuit 16 of FIG. 3 at inputs 32 and 33, respectively, and convert the analog values to binary numbers. Each ADC is seen to have a plurality of outputs, indicated at 34 and 35, to provide digital indications of the analog amplitudes $A_1$ and $A_2$ of the two incoming waveforms.

With regard to generation of the digital representation of the $A_1$ amplitude, operating selector display logic circuit 36 is of importance.

Not only does display count selector logic circuit 36 include a plurality of digital gates at the output of ADC's 30 and 31, but it also is seen to connect to digital comparator circuit 37. A primary purpose of logic circuit 36: to initiate operations, say in response to enabling signals to select $A_1$ or $A_1/A_2$ ADC pulses to be counted by accumulator 40 and select appropriate time intervals for accumulation, to aid in its control function of ADC's 30 and 31, as well as to control count comparator circuit 37. Its operations are, of course, synchronized with those of count comparator circuit 37 and ADC's 30 and 31 through operation of reset circuit 38; the latter also aids in the control of bit-flow indicating circuit 39 interconnected with ADC's 30 and 31, as explained below. Display 27 includes accumulator logic circuit 40 tied to LED display 41 through driver logic circuit 42. I.e., when accumulator circuit 40 receives counts indicative of $A_1$ or $A_1/A_2$ values of interest, transfer and reset logic circuit 40a and accumulator 40b are operated in conjunction with driver logic circuit 42 to provide for display of these values at display 41.

In providing initial indications, first and second voltage comparators (VC's) within ADC's 30 and 31 are used; each VC accepts either the $A_1$ or $A_2$ analog signal at its input and provides an output so long as an "unbalanced" condition within the VC remains. The VC digital output is used to enable a gate to pass a pulse train to the 12-bit counter, as determined by the comparator "unbalance". The output of the counter enables a digital-to-analog converter (DAC) ladder network, whose output yields the analog of the binary count of the counter. That output is looped back to the input of the voltage comparator. Result: when the analog output value of the DAC ladder network is equal to the $A_1$ (or $A_2$) peak amplitude at the voltage comparator (i.e., the VC is "balanced"), the reference pulse train is interrupted at logic gate 36.

It should be apparent that the enable for the system by the operator has a direct effect at selector logic circuit 36 and in turn at the accumulator logic circuit 40.

Assume the $A_1$ DVM enabling signal has been applied to select logic circuit 36 in FIG. 5. Result: counts from the counter of ADC 30 are passed to accumulator circuit 40. The enabling $A_1$ signal also provides indicator gate selector 36b with the proper gate to do the accumulation of counts during the proper time of measurement of the $A_1$ peak. At the end of the gate selected cycle, the count is stored in accumulator 40b; a transfer-and-reset pulse is introduced to accumulator 40b via transfer-and-reset circuit 40a. The transfer pulse transfers the count information accumulated during the counting to display 41 through drivers 42. Following the transfer, transfer-and-reset circuit 40a resets accumulator 40b. The count and display cycling occurs every 1.11 seconds, assuming a master clock rate (i.e., $C_1/10^4$) is equal to 0.9 Hz. At the beginning of each $A_1$ or $A_2$ measurement, A/D reset circuit 38 resets all system counters to zero to ensure accuracy, i.e., that no extraneous counts affect the accuracy of the cycle.

Operation of digital voltmeter module 26, as well as display 27, is paced by the clock rate $C_1/10^4$ where $C_1$ is 9 kHz, the latter being produced by digital clock circuit 23 of FIG. 3.

Various other clock rates are of importance: A $100C_1$ rate is used as the up-count rate for ADC 30 and as the interrogation rate for count comparator circuit 37; a $C_1$ rate is used in the down-count for ADC 30; a $50C_1$ count of ADC 31 is also used; and a $5C_1$ clock is useful for operation of transfer-and-reset circuit 40a, as explained below.

Note also that reset circuit 38 is also paced by master clock rate $C_1/10^4$ whereby synchronization of ADC's 30 and 31, count comparator circuit 37 and bit-flow indicator circuit 39 is conveniently assured as previously indicated.

On the other hand, generation and indication of the $A_1/A_2$ count involves an arithmetic operation in which the $A_2$ counts (as provided by ADC 31) are divided into the $A_1$ counts (as provided by ADC 30). For this operation, ADC 31 first must provide an $A_2$ count proportionate to the $A_2$ peak analog amplitude of the waveform at input 33.

Briefly, for this operation, all of the $A_2$ counts associated with the second waveform are permanently stored in one counter and counts equal to one-half this value are temporarily stored in another counter. For comparing the $A_1$ and $A_2$ counts, a separate logic gate at the ADC associated with the $A_1$ signal, termed the "$A_1$ ADC" is enabled to pass a count-down clock equal to $C_1$ to the $A_1$ counter, ADC 30, while simultaneously another gate is enabled to pass another clock equal to $100C_1$ to further count up the $A_2$ temporary storage counter within comparison circuit 37. This counter counts up until its count matches that of the $A_2$ permanent storage counter at ADC 31 at which time the comparator resets the temporary storage counter, and delivers a count via selector logic circuit 36 to accumulation logic circuit 40; the $A_2$ count-compare-reset operation continues until the $A_1$ counter has counted down to zero. The logic gate used to pass the resultant pulse count, i.e., $A_1/A_2$ count, to the display counter is then disabled. A transfer and reset circuit in circuit with the display counter is used to update both $A_1$ and $A_1/A_2$ displays at the 0.9 Hz clock rate of the system. To further explain the above action, assume the $A_1$ counter contains $A_1$ counts and the $A_2$ permanent storage counter contains $A_2$ counts. IF $A_2$ is even, $A_2$ temporary storage counter contains $A_2/2$ counts, but if $A_2$ is odd, it contains $A_2$-½ counts. Since the $A_1$ counter is clocked down toward zero at a rate of 100 times slower than the clocking rate driving the $A_2$ temporary storage counter, we note that 100 times $A_1$ clock pulses will be applied to the latter counter before the dividing action is stopped. The number of compares, C, which will result are, therefore, either $$C = \frac{100 A_1 + \frac{A_2}{2}}{A_2} \text{ if } A_2 \text{ is even}$$

or $$C = \frac{100 A_1 + \frac{A_2-1}{2}}{A_2} \text{ if } A_2 \text{ is odd}$$

These can be combined into one expression:

$$C = 100\frac{A_1}{A_2} + \frac{1}{2}\left[\begin{array}{l}+0 \quad (A_2 \text{ even})\\ -\frac{1}{2A_2} \quad (A_2 \text{ odd})\end{array}\right]$$

The comparator circuit 37 can only output integer values; therefore, if $$100 A_1/A_2 = I + B$$

where I is some integer and B is a fraction, then if $$B \geq \frac{1}{2} \begin{bmatrix} -0 \\ +\frac{1}{2A_2} \end{bmatrix}$$

C will be 100 $A_1/A_2$ rounded off to the next-highest integer $I+1$. If $$B < \frac{1}{2} \begin{bmatrix} -0 \\ +\frac{1}{2A_2} \end{bmatrix}$$

then C will be 100 $A_1/A_2$ rounded off to the integer I. Since $A_2$ is, in general, greater than 200, as will be described later, $\frac{1}{2}A_2$ will therefore, in general, be no greater than 1/400. From the above it is evident that prefilling the $A_2$ temporary storage register with $A_2/2$ counts before initiating dividing process consequentially increases the accuracy with which C expresses 100 $A_1/A_2$.

As previously mentioned, the count-compare-reset cycle of course is continued until such time as the ADC counter within ADC 30 is counted to zero, such count then disabling selector logic gate circuit 36, which prevents passage of any more reset pulses produced by count comparator circuit 37 from reaching accumulator 40b. The final count is thus seen to be equal to the logic function 100 times $A_1/A_2$, and such value is read at LED display 41 where a decimal point is provided to cause the display to show the value $A_1/A_2$ and is updated at the $C_1 > 10^4$ clock rate which paces the entire operations, as via display transfer-and-reset logic circuit 40b of accumulator logic circuit 40.

It is evident in FIG. 5 that selector logic gate circuit 36 not only includes display count selector logic gates 36a (which are selectively enabled via operator intervention at his control console) but also comprises gate selector circuit 36b; briefly, the latter automatically operates to provide (depending upon the operator enabling sequence) an enabling gate which forms a selected driving window over which counts from either ADC 30 or ccunt comparator circuit 37 can be accumulated by accumulator 40b for display at display 41. It should be evident that operation of display count selector circuit 36a is also associated with the type of enablement at accumulator 40b as prescribed by the $A_1$ or $A_1/A_2$ enabling signals; only one set of values can be displayed at any one moment.

It is further evident that accuracy of the display at display 41 is enhanced by the usage of $A_1$ and $A_2$ bit flow indicator circuit 39 in series with ADC's 30 and 31.

Briefly, circuit 39 is operative as a function of counter conditions within ADC's 30 and 31, respectively, and has as its purpose to indicate bit overflow or underflow conditions whereby accuracy of the final result, such as depicted at display 41 can be assured. In more detail, bit-flow detector 39 includes separate $A_1$ overflow detector 44 in parallel with $A_2$ bit-flow detector 45; the former indicates overflow conditions within the $A_1$ counter of ADC 30, based on generation of the carry-out (CO) bit vis-a-vis a complementary master clock $C_1/10^4$ as detected by a D-type flip-flop in circuit with accumulator logic circuit 40. Should the generation of the most-significant bit (MSB) be such as to indicate an overflow condition within the $A_1$ counter of ADC 30, the D-type flip-flop provides an interruptable signal to a decimal select circuit, a part of accumulator 40b, which intermittently energizes decimal point displays at display module 27 so as to provide a "blinking" decimal display, except that the one decimal point in use is not undergoing such interruption, as explained in detail below. If a change in $A_1$ overflow condition is indicated, correcton is relatively simple; the operator alters the switch setting via switch element 20a (FIG. 4) controlling the amplitude of the DC current flowing to the geophones under test.

Operations of $A_2$ flow detector 45 are as follows: a separate D-type flip-flop can be activated to provide a drive signal via conductor 46 to operate separate LED displays (not shown) for operator observation. Either the falling edge of the MSB signal generated within the $A_2$ counter of ADC 31 (overflow) or the falling edge of an MSB-k signal where K is say 3 (underflow) triggers an appropriate signal via conductor 46 for operator observation. Suffice it to say at this time that the logic rules of $A_2$ bit flow conditions are such to allow the human operator to intervene to prevent the counters within the ADC's from being overloaded or undervalued during operations of the circuit of the present invention. E.g., correction for the $A_2$ overflow or underflow conditions can occur via changes in switch setting of switch 58 (FIG. 4) recalibrating the gain of the $A_2$ amplifier 61 in the responder analog circuit 16. Obviously, the $A_2$ value should be kept as high as possible without overloading the $A_2$ counter of ADC 31 of FIG. 5.

In either $A_1$ or $A_1/A_2$ operating modes, ADC's 30 and 31 of FIG. 5 can both be enabled and operate continuously. Note also that the human operator can intervene if he is alerted to underflow or overflow conditions within the ADC counters of ADC's 30 or 31 via operation of bit-flow detector 39, as explained above.

Figure 6:
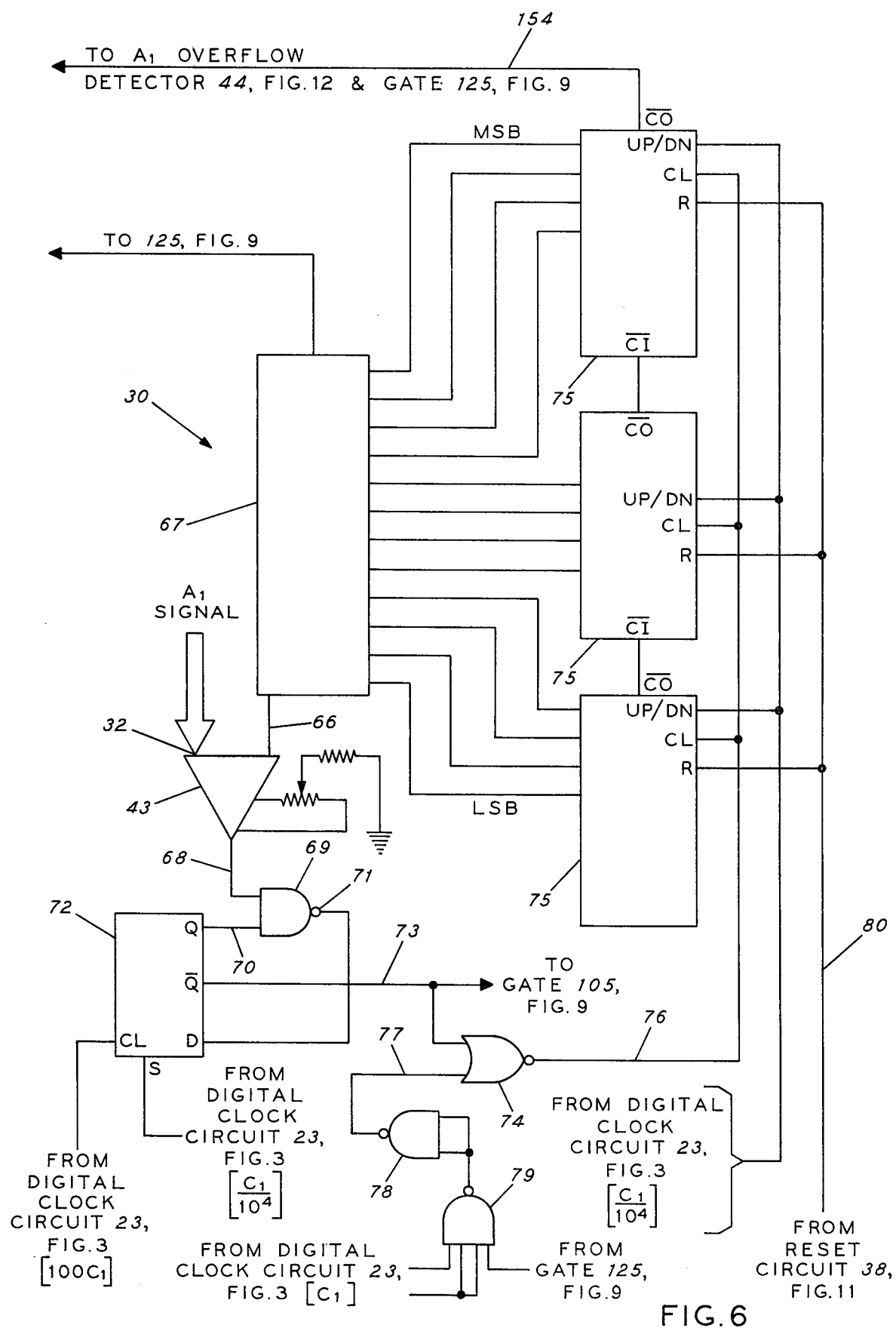
FIGS. 6 and 7 are other circuit diagrams of certain aspects of the digital voltmeter and display module of FIG. 5, say illustrating separate analog-to-digital conversion circuits (ADC's) useful in identifying in display the separate response characteristics of the geophones.
Figure 7:
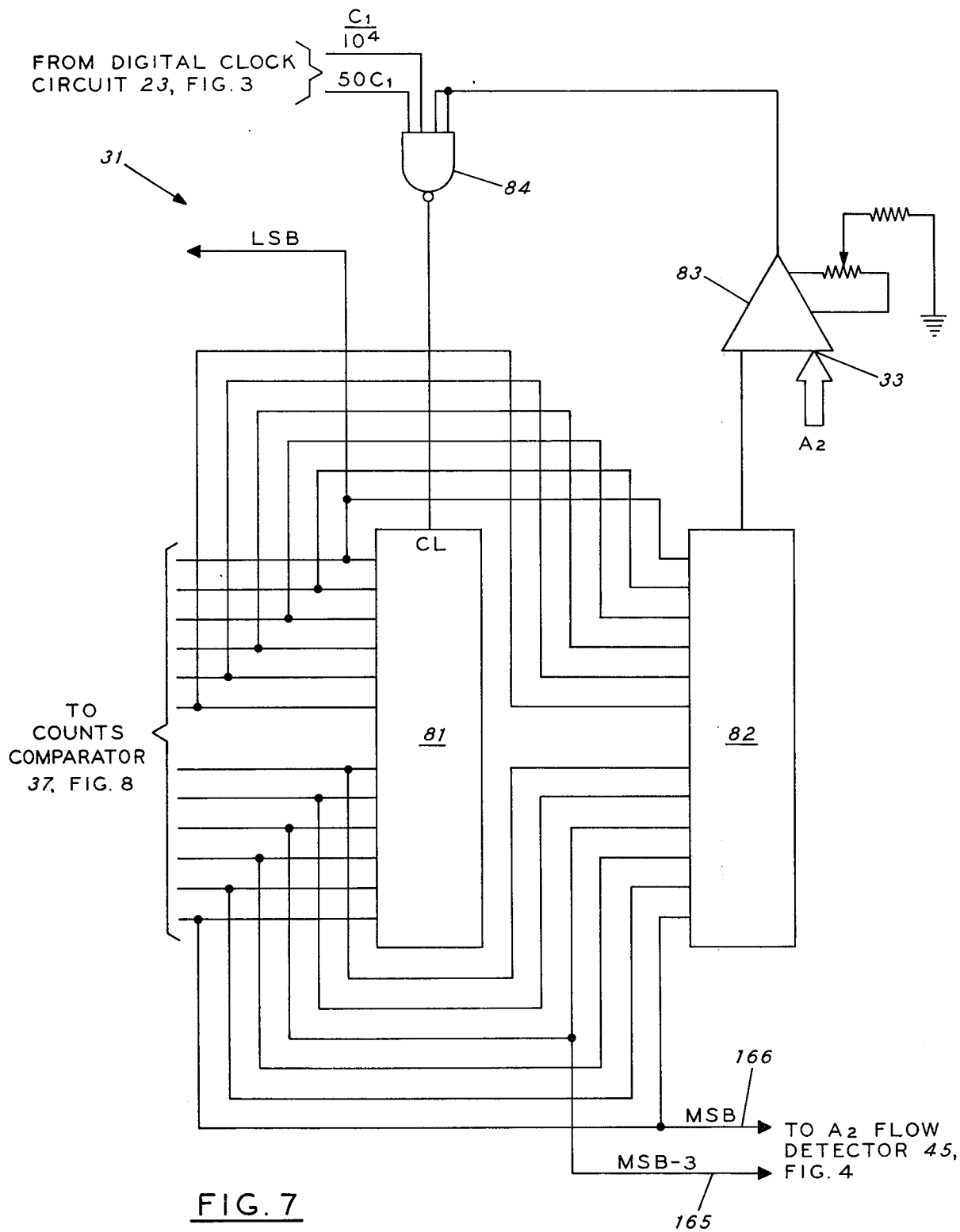

FIGS. 6 and 7 illustrate operations of ADC's 30 and 31 in detail.

In FIG. 6, ADC 30 includes voltage comparator (VC) 43 having an input 32 for entry of the damped waveform containing instantaneous $A_1$ voltage as a peak maximum. Comparator 43 has a second input 66 connected to an output of a digital-to-analog converter (DAC) ladder network 67. VC 43 also has an outlet 68 connected to NAND gate 69. NAND gate 69 has an input leg 70 as well as an output 71 tied to D-type flip-flop 72; of importance is the latter's complementary output 73; it not only feeds NOR gate 74, but it forms a direct input to gate 105 of FIG. 9 of selector display logic circuit 36 of FIG. 5.

Determination of the $A_1$ counts due to operaton of up-down counter 75 has been previously explained. Note that NOR gate 74 has a second leg 77 by which up-down counter 75 can be down-counted via gates 78 and 79 at the clock rate $C_1$. Such operations are incident to generation of the arithmetic logic function $A_1/A_2$, as previously mentioned; note also that counter 75 can be periodically reset as a function of master clock $C_1/10^4$ through reset circuit 38, FIG. 5, i.e., reset signals for up-down counter 75 pass thereto via conductor 80 connected to reset circuit 38 in FIG. 5.

In this regard, note that accumulator and logic control circuit 40b of FIG. 5 counts the same clock that counts up counter 75 and ADC 30. The accumulator circuit 40b has a maximum clock rate that is much lower than the count rate of counter 75 of ADC 30; however, to prevent clock frequencies greater than count rate of accumulator circuit 40b from occurring (usually due to the operation of comparator 67), flip-flop 72 of FIG. 6 is of importance. It is used to clock counter 75. But when comparator 43 goes to a low state (and when hash is generated), flip-flop 72 through gate 69 (FIG. 6) becomes inoperative so that the hash previously referred to is prevented from passing through to accumulator 40b (via line 107 and gate 105 of FIG. 9).

Figure 8:
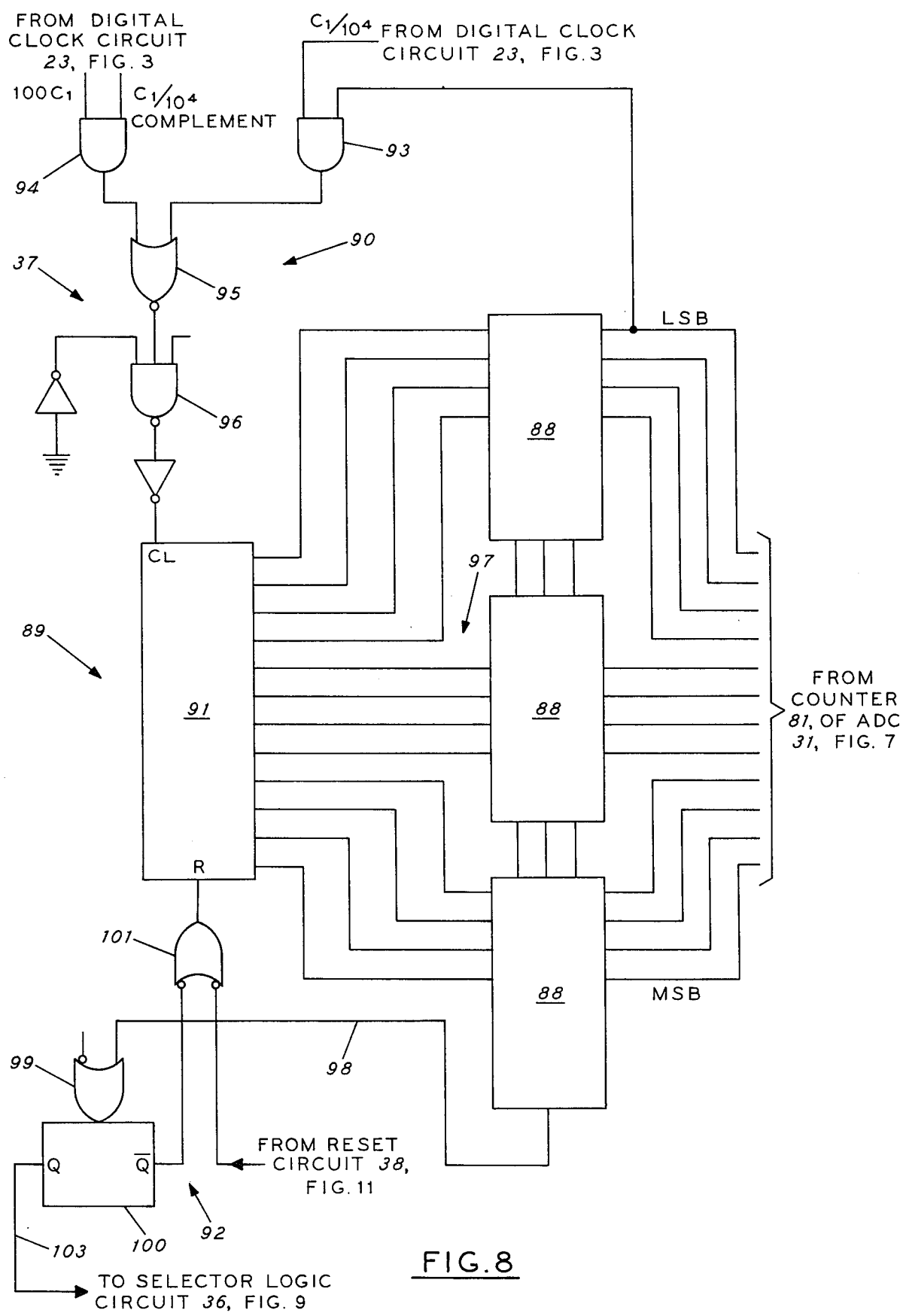
FIG. 8 is a circuit diagram of a count-and-compare circuit of the digital voltmeter circuit of FIG. 5.

As shown in FIG. 8, count comparator circuit 37 includes a three-stage comparator 88 tied to counter 81 of ADC 31 of FIG. 7 and counter 91. Its operation is as follows: during the time that the $A_2$ amplitude is being determined and racked up in counter 81 of ADC 31, FIG. 7, the least significant bit (LSB) is clocked to counter 91 at one-half of the weight of the clocking rate of counter 81. In short, the clock count in counter 81 is divided by two at the LSB output of counter 81. Note also that the LSB signal travels to AND gate 93 of network 90 where it combines with the input clock $C_1/10^4$ from digital clock circuit 23 of FIG. 3 and thence via gates 95 and 96 to counter 91. During the time that the impulse waveform $A_2$ is being counted up in counter 81 of FIG. 7, the $C_1/10^4$ input at gate 93 is in a HI state. In other words, AND gate 93 is enabled to permit the LSB clocking to pass through the gates 95 and 96 and hence to the clock input of counter 91.

However, during this time, the complementary input clock $C_1/10^4$ to the input of AND gate 94 is also inhibiting a $100C_1$ clock count. The result: counter 91 is being clocked up at one-half the rate of counter 81, FIG. 7, as previously mentioned, and will hold within its register one-half of the value of the $A_2$ amplitude count for the purpose of increasing the accuracy of the division of $A_1$ by $A_2$ counts in the description previously given.

Immediately after the impulse measuring cycle dictated by the $C_1/10^4$ clock throughout the system has been completed, the pre-excitation cycle of the geophone is again entered. At that time, gate 93 of FIG. 8 is closed; but gate 94 is enabled with the end result that gate 94 is opened. The $100C_1$ clock counts now find their way into the clock input of counter 91 and continue to count counter 91 up at the $100C_1$ clock rate. That process will continue until the count in counter 91 is equal to the count stored in counter 81 of ADC 31, FIG. 7. At that point, a compare is obtained in comparator 88 and this compare then feeds from comparator 88 via line 98 into OR gate 99 of compare reset logic circuit 92, which drives one-shot 100 whose Q complementary output feeds through OR gate 101 to the reset output of counter 91 and whose other Q output delivers a compare via line 103 to gate 106 of selector logic circuit 36, FIG. 9. After counter 91 has been reset and in an uninterrupted fashion, clock $100C_1$ continues to be passed through gate 94 to again count up counter 91 until another compare is obtained in comparator 88, at which time again the output feeds OR gate 99, which triggers one-shot 100, which in turn resets counter 91.

During this time, recall from FIG. 6 that the $C_1$ clock (where $C_1$ equals 9000 Hz) to AND gate 79 is eventually fed through NAND gate 78 and NOR gate 74 into the clock input of counter 75. Due to the action of the up-down control exercised by $C_1/10^4$ train controlling up-down counter 75, it is apparent that up-down counter 75 is being counted down at the $C_1$ clock rate, while in FIG. 8 counter 91 is being cycled with a $100C_1$ clock. The operation continues until counter 75, FIG. 6, has counted down to zero. At this time and due to the action taking place on carry-out line 128 of FIG. 9 to gate 125 of the selector logic circuit 36, FIG. 9, the process is terminated, the division process stopping when register 75, FIG. 6, provides the carry-out signal. The carry-out signal, after disabling the gate 125 of FIG. 9, also causes the disabling of gate 106 (via line 123) and gate 130, FIG. 9, via line 131. Note that gate 106 controls the count for each compare from one-shot 100 of FIG. 8 and passes its count through the gate 110 of gate network 109 (FIG. 9) and one via line 112 through other gates to the accumulator and control logic circuit 40b, FIG. 10.

In summary, while counter 91 is clocked at a $100C_1$ clock rate, counter 75 has been clocked down at a $C_1$ clocking rate. During the process, an output from one-shot 100 has been sending pulses to selector logic circuit 36, FIG. 9, and thence for display via accumulator and control logic circuit 40b.. Result: $A_1$ has been divided by $A_2$ to a fairly reasonable degree of precision. The mathematical manner in which this is done has been previously set forth. Within the accumulator and control logic circuit 40b, at this time, the number of divides has been accumulating. When the carry-out signals is produced at gate 106, FIG. 9, disabling that gate, pulses from the division process are prevented from getting through. At the same time that gate 106 is disabled, gate 130 is also inhibited, disabling the gate window of accumulator 40, i.e., disabling occuring via NOR gates 116, 117a and 117b and line 118 for the accumulator and logic control circuit 40b. Thus the gate and the clock signals are both disrupted from the latter. The carry-out signal to gate 125 which disables it prevents the $C_1$ clock from further clocking the ADC 30 counter down; therefore, that counter stays at zero. The count and compare is, of course, taking place in ADC 31: compares between comparator 88 and counter 91 continue, but outputs from the one-shot 100 that are counted by the accumulator and logic control circuit 50b are discontinued by the disabling of gates that route that signal to the latter.

FIG. 7 illustrates ADC 31 in detail.

Note the similarity with ADC 30 of FIG. 6; the binary value equal to amplitude peak $A_2$ is stored within counter 81 connected through DAC ladder network 82 to voltage comparator (VC) 83. Logic for operations of ADC 31 is provided via NAND gate 84. Note that leg 86 of NAND gate 84 is tied to the output of VC 83 and terminates the clock output from 84 when the waveform maximum voltage $A_2$ has been reached, has been digitally stored in 81 and caused output 82 to equal $A_2$ in value.

The count rate clock for counter 81 is $50C_1$. Note that the output of counter 81 not only connects to DAC ladder network 82, but also feeds parallel binary data to counts comparator circuit 37.

Figure 10:
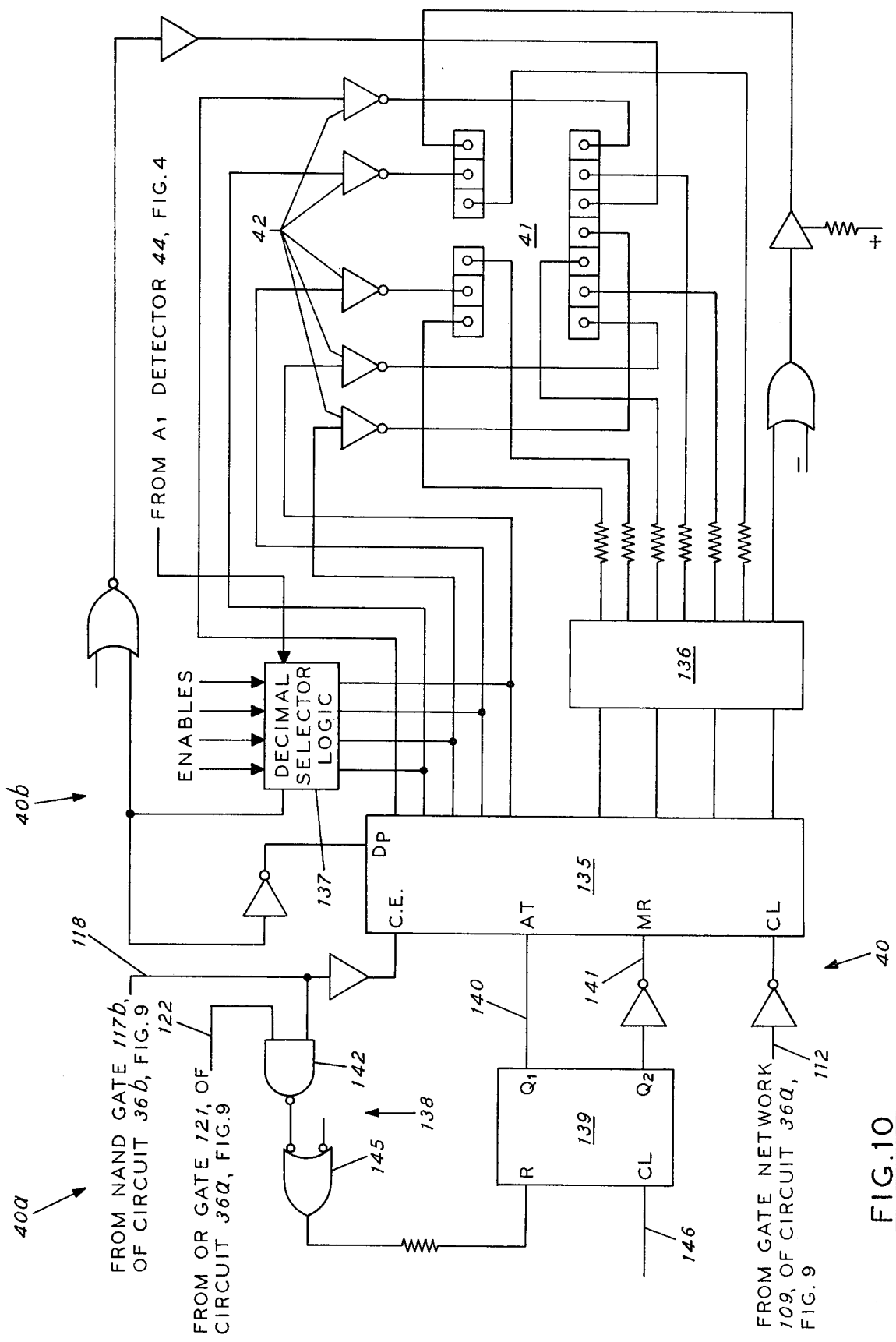
FIG. 10 is a circuit diagram of a display of digital voltmeter and display module of FIG. 5 in circuit with a logic accumulator, said display including a series of LED's forming a seven-segmented display.

FIG. 10 illustrates accumulator logic circuit 40 in more detail, such circuit 40 being shown in conjunction with segmented LED display 41.

As shown, accumulator logic circuit 40 receives signals at its inputs for accumulation and the indication within display 41, as required. For this purpose, accumulator logic circuit 40 comprises transfer and reset logic circuit 40a in circuit with accumulator and control logic circuit 40b. As previously mentioned, the latter directs segmented display module 41 in correct synchronization so as to provide a decimal display to the human operator; drive logic circuit 136 comes into play; it acts in the establishment of a change of binary coded decimal code to a seven-segment display code over which the $A_1$ counts or the $A_1/A_2$ counts are to be processed for the seven-segment display.

Figure 9:
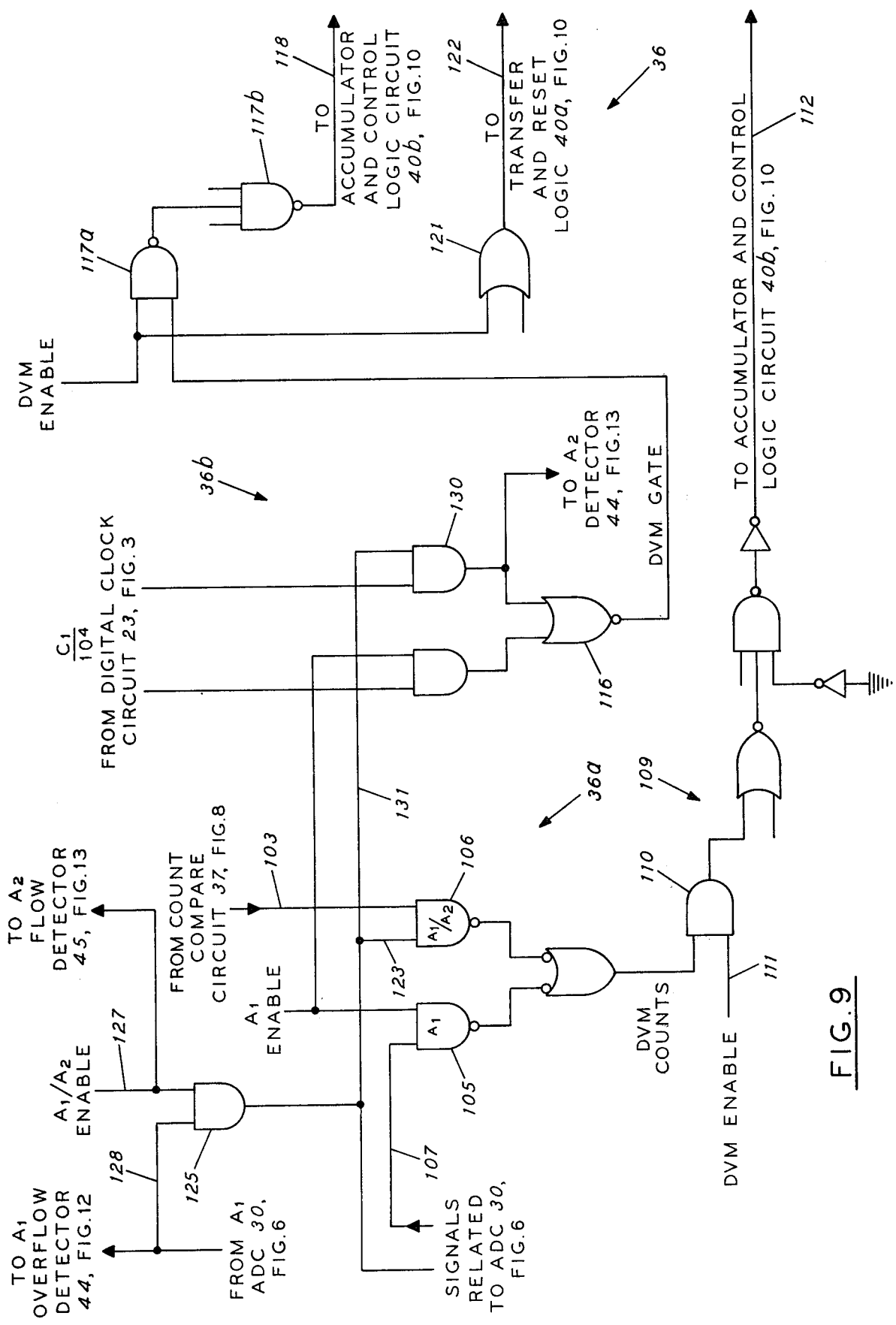
FIG. 9 is a schematic circuit diagram of logic gates and associated circuitry of the digital voltmeter and display module of FIG. 5.

The heart of accumulator and logic control circuit 40b is accumulator 135 having a clock input connected to gate network 109 of circuit 36a of FIG. 9 via conductor 112. In that way, the $A_1$ or $A_1/A_2$ counts can be clocked to counter 135. Enabling of counter 135 is by way of enabling signal gennerated from NAND gate 117b of circuit 36b which pass therefrom by way of conductor 118.

Transfer and reset logic circuit 40a also includes separate gate network 138 in circuit with one-of-ten counter 139. These elements are positioned in conjunction with NAND gate 117b to generate additional control signals for operation of counter 135 via inputs 140 and 141 thereof. For this purpose, gate network 138 includes NAND gate 142, connected to OR gate 121 of circuit 36b via line 122 (FIG. 9) to receive a $C_1/10^4$ timing signal, and to NAND gate 117b via line 118. OR gate 145 provides for resetting of counter 139 as appropriate, and for the generation of timing signals $Q_1$ and $Q_2$ for inputs 140 and 141 of the counter 135. Transfer and resetting of counter 135 is at the same rate as that provided by reset circuit 38 of FIG. 5.

Figure 11:
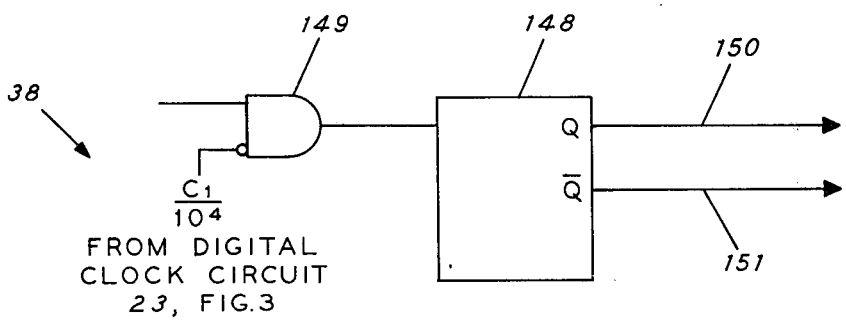
FIG. 11 is a reset circuit useful in sequential operations of the testing apparatus of FIGS. 1 and 3.

FIG. 11 illustrates reset circuit 38 in more detail.

As shown, reset circuit 39 consists of one-shot 148 driven by AND gate 149 at a $C_1/10^4$ clock rate. Its outputs 150 and 151 are used to reset the circuit as follows: the Q signal is used to reset circuit comparator 37; while the complementary Q signal at output 151 is used to reset ADC's 30 and 31 as well as bit-flow detector 39.

Figure 12:
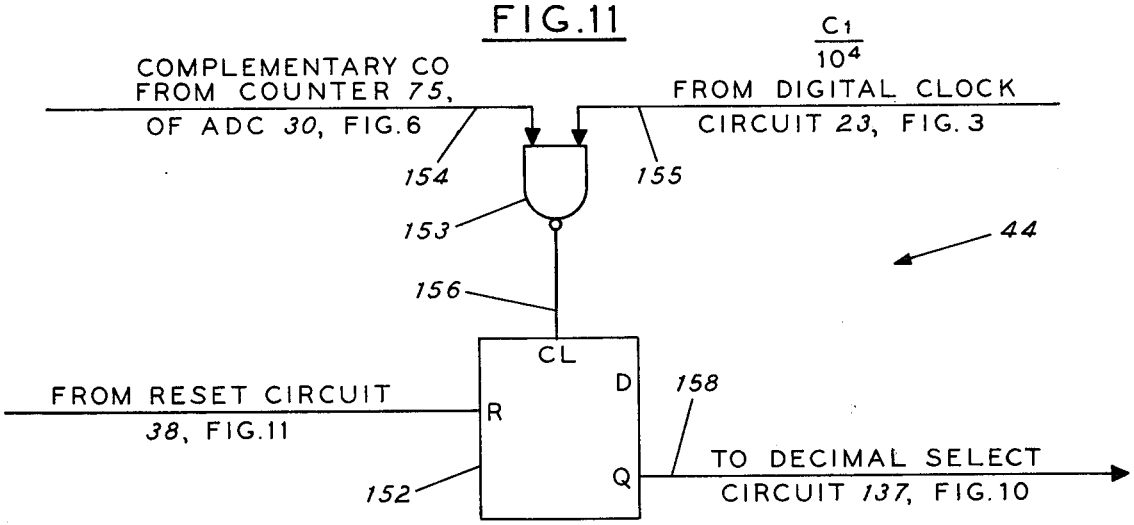
FIGS. 12 and 13 are circuit diagrams of bit over- and underflow detector circuits of the digital voltmeter and display module of FIG. 5.
Figure 13:
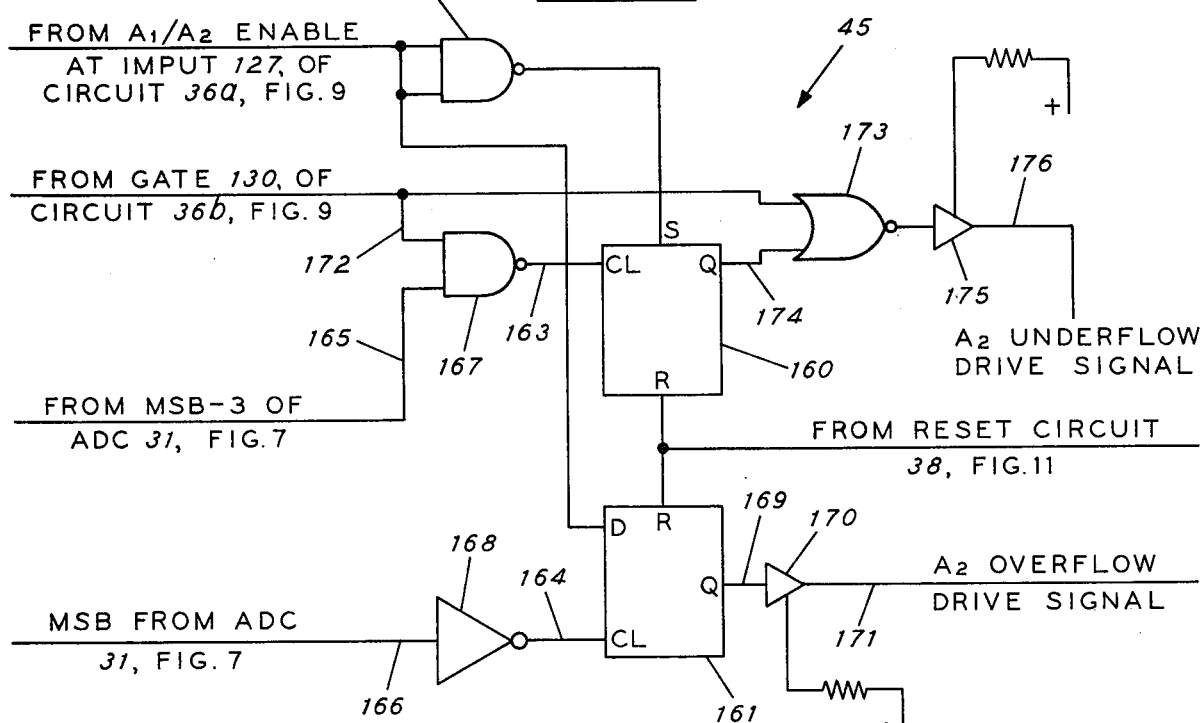

FIGS. 12 and 13 illustrate bit-flow detector 39, FIG. 4, and in particular $A_1$ overflow detector 44 and $A_2$ over/underflow detector 45, respectively.

As shown in FIG. 12, $A_1$ overflow detector 44 includes flip-flop 152 in circuit with NAND gate 153. Input 154 of gate 153 is connected to the complementary carry-out (CO) output of counter 75 of FIG. 6. When a signal indicative of a change in the occurrence of the CO output is produced and the $C_1/10^4$ clock changes state, gate 153 is enabled. Thus the following logic rule related to typical counter overflow is invoked: changes in the CO bit coupled with proper state change of the $C_1/10^4$ clock via line 155 will produce a signal output from flip-flop 152; i.e., at output 158. Flip-flop 152 is reset by the reset 150 of FIG. 11. The signal at 158 enables all decimals with decimal selector logic 137 (FIG. 10). This signal is interrupted by the reset rate $C_1/10^4$, causing the overflow-indicating decimals to blink.

Note that the CO bit causes a change from a high to a low state at NAND gate 153; coupled with appropriate changes in the $C_1/10^4$ clock, a HI can be produced by the flip-flop 152 at output 158 to indicate an overflow condition.

FIG. 13 illustrates $A_2$ under/overflow detector 45 in more detail.

As shown, flow detector 45 includes a pair of flip-flops 160 and 161. They are enabled by an $A_1/A_2$ enabling signal at input 127 of logic gate 36a of FIG. 9. Note that the enabling signal $A_1/A_2$ is also fed to the D input of 161 as well as to NAND gate 162, and thence to the S input of flip-flop 160. Clock inputs 163 and 164 initiate indications of either $A_2$ underflow or $A_2$ overflow conditions of ADC 31 of FIG. 7.

As shown in FIG. 7, note that connected to certain inputs of DAC ladder network 82 are parallel output conductors 165 and 166. These conductors convey the indicated MSB and MSB-$k$ data (say where $k=3$) to flip-flops 160 and 161 of FIG. 13.

As to the latter, the MSB data through amplifier 168 is clocked to input 164 of flip-flop 161 when the MSB falls from a positive value to ground potential. AT such a condition, the output at 169 in conjunction with amplifier 170 is used to provide at conductor 171 a drive signal for an LED (not shown) whose light is observable by the operator. Note further with regard to flip-flop 161 that the MSB must go to a high state (HI) and return to a low state (LOW) in order that a leading edge may trigger the flip-flop 161. In other words the MSB has come up once and then has fallen (which indicates that all bytes in the register of the ADC 31 must have gone to a 1 and then one more count causes an overflow). The flip-flop 161 is then triggered and its output 161 drives the LED display. Thereafter, reset circuit 38 is operative to reset the flip-flop 161 at the beginning edge of each A-D conversion.

In summary, if an overflow in ADC 31, occurs, the reset circuit 38 will reset to flip-flop 161 and wait for another overflow indication. If none occurs, the LED will stay out.

Now looking at the underflow circuitry associated with flip-flop 160, the gate 167 is enabled by the $C_1/10^4$ clock coming from gate 130 of circuit 36b, FIG. 9, and also has an input of MSB-3 data from the ADC 31. If MSB-3 holds true, (ONE state) nothing will happen because the gate 167 will stay high on its output and the clock on the flip-flop 160 will not see a rising edge. But if the MSB-3 goes high and then goes low, the output of gate 167 will go low and then go high, and on going high will change the state of flip-flop 160. The Q output at output 174 then is high to gate 173. Gate 173 is a NOR gate whose HI output requires both inputs be low. Since flip-flop 160 has been triggered and Q at output 174 is high, the output of the gate 173 cannot be high. Therefore, the LED will stay out.

But suppose no MSB-3 signal appears at gate 167; then the flip-flop 160 does not get flipped. The Q signal at output 174 stays low. Then when the $C_1/10^4$ clock goes low into the other input of gate 173, its output goes high and drives the LED. But this display only "blinks" because it is constantly being reset as a function of the same reset rate as provided by the reset circuit 38.

While specific embodiments of the invention have been described in detail, it should be understood that the invention is not limited thereto, as many variations will be readily apparent to those skilled in the art and, thus, the invention is to be given the broadest possible interpretation within the terms of the following claims.

What is claimed is:

1. Circuit for testing a geophone of a data acquisition system by initially forcing a coil of said geophone from its natural rest position, then releasing said coil and monitoring damped coil vibration at an output of said geophone by digitally indicating response representations related to first and second adjacent, first occurring peak amplitudes of said vibration above and below a horizontal datum line, whereby geophone performance characteristics can be determined, comprising:

a generator for forcing said coil from its rest position and then releasing said coil;

means for generating and monitoring first and second response waveforms having peak amplitudes $A_1$ and $A_2$ related to said damped coil vibration peak amplitudes after said generator has released said coil of said geophone from its off-normal position, said $A_1$ and $A_2$ peak amplitudes being the first peak above (or below) a datum and the next-in-time peak below (or above) said datum, respectively;

said generating and monitoring means including (i) analog responder circuit means including first and second amplifying and conditioning circuits each in series with said geophone output; (ii) automated digital indicating and display means connected to said analog responder circuit means for separately generating binary digits, said automated digital indicating and display means including associated means for generating, storing and comparing counts proportional to a constant less than one times said $A_2$ response representation whereby counts proportional to and indicative of said $A_1$ response representation and an $A_1/A_2$ representation can be accurately generated and displayed so that geophone performance characteristics can be determined.

2. Circuit of claim 1 in which said first amplifying and conditioning circuit has an input connected to said geophone output and a plurality of outputs, one of which connecting to said digital indicating and display means and another of which is connected to an input of said second amplifying and conditioning circuit.

3. Circuit of claim 2 in which said second amplifying and conditioning circuit includes a limiting means for selectively cutting off amplitude response of that portion of said response waveform generated by said first amplifying and conditioning circuit that is particularly associated with said first occurring peak amplitude of vibration above said datum line.

4. Circuit of claim 1 in which said first response waveform is directly associated with the damped equation of coil vibration and is of the form $$x = K_1[e^{-\alpha t}]\sin \omega t$$

where $x$ is volts, $K_1$ is a constant, $t$ is time, $\omega$ is angular speed and $\alpha$ equals $\omega_o b$ where $\omega_o$ is the resonant angular speed of the coil equal to $2\pi f_o$ where $f_o$ if the resonant frequency and $b$ is the damping factor.

5. Circuit for testing a geophone of a data acquisition system by initially forcing a coil of said geophone from its natural rest position, then releasing said coil and monitoring damped coil vibration at an output of said geophone by digitally indicating response representations related to first and second adjacent, first occurring peak amplitudes of said vibration above and below a horizontal datum line, whereby geophone performance characteristics can be determined, comprising:

a generator for forcing said coil from its rest position and then releasing said coil;

means for generating and monitoring first and second response waveforms having peak amplitudes $A_1$ and $A_2$ related to said damped coil vibration peak amplitudes after said generator has released said coil of said geophone from its off-normal position, said $A_1$ and $A_2$ peak amplitudes being the first peak above (or below) a datum and the next-in-time peak below (or above), said datum, respectively;

said generating and monitoring means including (i) analog responder circuit means including first and second amplifying and conditioning circuits each in series with said geophone output; (ii) automated digital indicating and display means connected to said analog responder circuit means for separately generating binary digits indicative of said $A_1$ response representation and an $A_1/A_2$ representation whereby geophone performance characteristics can be determined, said digital indicating and display means comprising:

i. first comparator and logic means, including analog-to-digital conversion (ADC) means for generating and storing counts proportional to $A_1$;

ii. second comparator and logic means included in ADC means for generating and storing counts proportionate to $A_2$ and $A_2/2$ in separate registers;

iii. logic and display means for separately displaying said $A_1$ and derived $A_1/A_2$ counts to aid in the determination of said geophone performance characteristics.

6. Circuit of claim 5 in which (iii) is further characterized by count-compare-reset (CCR) means cooperatively interconnecting to $A_1$, $A_2$ and $A_2/2$ registers, including:

i. a clocking means to clock down said $A_1$ register to zero;

ii. a clocking means to clock up said $A_2/2$ register at a rate 100-fold higher rate than the clocking rate applied to the $A_1$ register;

iii. a comparator and reset means which will reset said $A_2/2$ register whenever its count equals that of said $A_2$ register; and iv. a gate means which permits reset pulses to pass to an accumulating means and which forbids the further passage of such pulses after said $A_1$ register has been clocked down to zero.

7. Circuit of claim 5 in which (i) is further characterized by a voltage comparator connected to said geophone output, for receiving a response voltage associated with said damped coil vibration, a source of clock pulses in circuit with said voltage comparator for generating a train of pulses; a logic gate at the output of the voltage comparator and said pulse source means, said logic gate being enabled so long as amplitude of said response voltage is increasing as a function of time;

a counter in circuit with said logic gate for receiving said train of pulses;

DAC ladder network interconnected between said counter, said logic gate and said voltage comparator operative to provide an analog signal to said voltage comparator as a function of said train of pulses and to disable said logic gate at the occurrence of said peak value $A_1$ of said response voltage.

8. Circuit of claim 5 in which (ii) includes a voltage comparator for receiving said second conditioned response voltage, a source of clock pulses in circuit with said voltage comparator for generating a train of pulses;

a logic gate at the output of said voltage comparator and said source of clock pulses, said logic gate being enabled so long as amplitude of said response voltage is increasing with time;

a counter in circuit wih said logic gate for receiving said train of pulses;

DAC ladder network means interconnected between said counter, said logic gate and said voltage comparator operative to provide an analog signal to said voltage comparator as a function of said train of pulses and to disable said logic gate at the occurrence of said peak value $A_2$; and a counter in circuit to accumulate $\frac{1}{2}$ the number of pulses in the train of pulses produced.

9. Circuit of claim 7 with the addition of an $A_1$ overflow bit detector in circuit with said counter of (i), including a signal generating means operative as a function of changes in a carry-out bit of said counter and a clock pulse from a clock source, whereby an $A_1$ overflow condition within said counter can be indicated.

10. Circuit of claim 8 with the addition of an $A_2$ bit-flow detector in circuit with said counter of (ii), including signal generating means operative as a function of selective change in a most-significant-bit (MSB) and of an MSB-k bit of said counter, to indicate overflow and underflow conditions within said counter.

11. Method of testing a geophone of a data acquisition system by initially forcing a coil of said geophone from its natural rest position, then releasing said coil and monitoring damped coil vibration at an output impulse to a coil of said geophone by digitally indicating response representations related to first and second adjacent peak amplitudes of said vibration above and below a datum line, whereby geophone performance characteristics can be determined, comprising:
  i. forcing said geophone coil from its rest position;
  ii. releasing said coil and allowing it to mechanically oscillate;
  iii. monitoring a response waveform having first occurring peak amplitude $A_1$ above and second-occurring peak amplitude $A_2$ below a datum related to said damped coil vibration after said generator has released said geophone coil;
  iv. using said first and second occurring peak amplitudes to drive automated digital indicating and display means;
  v. separately digitizing representations proportional to $A_1$, $A_2$ and a constant less than one times $A_2$ to aid in accurately generating counts proportional to said $A_1$ and $A_1/A_2$ representations and then displaying said $A_1$ and $A_1/A_2$ counts to that geophone characteristics can be indicated.

12. Method of claim 11 in which step (ii) is further characterized by said damped waveforms being periodic with said first occurring peak amplitude $A_1$ above said datum and said next adjacent peak amplitude $A_2$ below said datum, being directly associated with the equation of coil motion and of the form $$x = K_1[e^{-\alpha t}]\sin \omega t$$

where x is volts $K_1$ is a constant, $t$ is time, $\omega$ is angular speed and $\alpha$ equals $\omega_o b$ where $\omega_o$ is the angular speed of the coil at resonance and $b$ is the damping factor.

13. Method of claim 11 further characterized by the additional step of calculating damping factor (b) and relative sensitivity (G) using said response representatives associated with said first and second peak amplitudes of said response waveforms.

14. Method of claim 13 in which said response representations are $A_1$ and $A_1/A_2$ and said damping factor (b) and sensitivity (G) are calculated in accordance with $$b = \sin \tan^{-1}(1/\pi)\ln |A_1/A_2| \qquad 1$$

where $b$ is the damping factor of interest; $A_1$ and $A_2$ are peak amplitudes as previously defined and $$G = [A_1 f_o \exp(\cos^{-1}b \tan \sin^{-1}b)]^{\frac{1}{2}}$$

where G is the relative sensitivity of the geophone under test; $A_1$ is the peak amplitude as previously defined; $f_o$ is the resonant frequency of the geophones; and $b$ is the damping factor as defined above.

15. Method of testing a geophone of a data acquisition system by initially forcing a coil of said geophone from its natural rest position, then releasing said coil and monitoring damped coil vibration at an output impulse to a coil of said geophone by digitally indicating response representations related to first and second adjacent peak amplitudes of said vibration above and below a datum line, whereby geophone performance characteristics can be determined, comprising:
  i. forcing said geophone coil from its rest position;
  ii. releasing said coil and allowing it to mechanically oscillate;
  iii. monitoring a response waveform having first-occurring peak amplitude $A_1$ above and second-occurring peak amplitude $A_2$ below a datum related to said damped coil vibration after said generator has released said geophone coil;
  iv. driving a digital indicating and display means to generate first and second series of pulse counts,
    said first series of pulse counts being proportional to said $A_1$ peak amplitude of said response waveform,
    said second series of pulse counts being proportional to said $A_2$ peak amplitude of said response waveform;
  v. accumulating said first series of pulse counts and a count characteristic equal to $A_1/A_2$, and
  vi. displaying said first accumulated series of pulse counts to indicate said $A_1$ peak amplitude and said accumulated characteristic equal to $A_1/A_2$ whereby geophone characteristics can be identified.

16. Method of claim 15 in which step (iv) is further characterized by
  generating said count characteristic equal to $A_1/A_2$ prior to accumulation, to indicate said amplitude ratio representation of interest.

17. Method of claim 15 in which step (iv) is further characterized by
  receiving said response waveform at a voltage comparator;
  generating a train of pulses and passing said train to a counter so long as amplitude of said response waveform is increasing as a function of time; and
  interrupting said train of pulses at the occurrence — in time — of said peak value $A_1$ of said damped response waveform.

18. Method of claim 16 further characterized by
  generating a second waveform having said first-occurring amplitude $A_1$ clipped therefrom but not said second-occurring peak amplitude $A_2$;
  receiving said second waveform at a voltage comparator;
  generating a train of pulses and passing said train to a counter so long as amplitude of said second waveform is decreasing as a function of time; and
  interrupting said train of pulses at the occurrence of said peak value $A_2$ of said second waveform.

* * * * *